United States Patent
Ossowska et al.

(10) Patent No.: US 9,897,685 B2
(45) Date of Patent: Feb. 20, 2018

(54) METHOD FOR DETECTING INTERFERENCE IN A RECEIVED SIGNAL OF A RADAR SENSOR, DRIVER ASSISTANCE DEVICE AND MOTOR VEHICLE

(71) Applicant: Valeo Schalter und Sensoren GmbH, Bietigheim-Bissingen (DE)

(72) Inventors: Alicja Ossowska, Pforzheim (DE); Udo Haberland, Holzgerlingen (DE)

(73) Assignee: VALEO Schalter und Sensoren GmbH, Bietighaim-Bissingen (DE)

( * ) Notice: Subject to any disclaimer, the term of this patent is extended or adjusted under 35 U.S.C. 154(b) by 358 days.

(21) Appl. No.: 14/435,858

(22) PCT Filed: Sep. 18, 2013

(86) PCT No.: PCT/EP2013/069352
§ 371 (c)(1),
(2) Date: Apr. 15, 2015

(87) PCT Pub. No.: WO2014/063866
PCT Pub. Date: May 1, 2014

(65) Prior Publication Data
US 2015/0301157 A1     Oct. 22, 2015

(30) Foreign Application Priority Data
Oct. 27, 2012    (DE) ........................ 10 2012 021 212

(51) Int. Cl.
*G01S 7/02*      (2006.01)
*G01S 13/93*     (2006.01)
*G01S 13/34*     (2006.01)

(52) U.S. Cl.
CPC ............ *G01S 7/023* (2013.01); *G01S 13/931* (2013.01); *G01S 13/34* (2013.01);
(Continued)

(58) Field of Classification Search
CPC .................. G01S 7/023; G01S 13/931; G01S 13/34–13/348; G01S 2013/9389; G01S 2013/9378; G01S 2013/9385
See application file for complete search history.

(56) References Cited

U.S. PATENT DOCUMENTS 4,710,772 A * 12/1987 Cantwell ............... G01S 7/2928
342/194
6,094,160 A   7/2000 Lajiness
(Continued)

FOREIGN PATENT DOCUMENTS

| DE | 10 2006 016 776 A1 | 10/2006 |
| DE | 10 2009 057 191 A1 | 6/2011 |
| JP | 2004347362 A * | 12/2004 |

OTHER PUBLICATIONS

International Search Report for corresponding International Application No. PCT/EP2013/069352, dated Jan. 2, 2014 (2 pages).

*Primary Examiner* — Matthew M Barker
(74) *Attorney, Agent, or Firm* — Osha Liang LLP

(57) ABSTRACT

A method for detecting interference in a received signal received by a radar sensor of a motor vehicle is disclosed. For detecting a target object in an environment of the motor vehicle, a transmit signal is emitted by the radar sensor, which includes a sequence of consecutive frequency-modulated chirp signals. The radar sensor then receives an echo signal reflected on the target object as the received signal with the superimposed interference. After receiving the received signal, the interference in the chirp signals of the received signal is detected.

12 Claims, 4 Drawing Sheets

Figure 1:
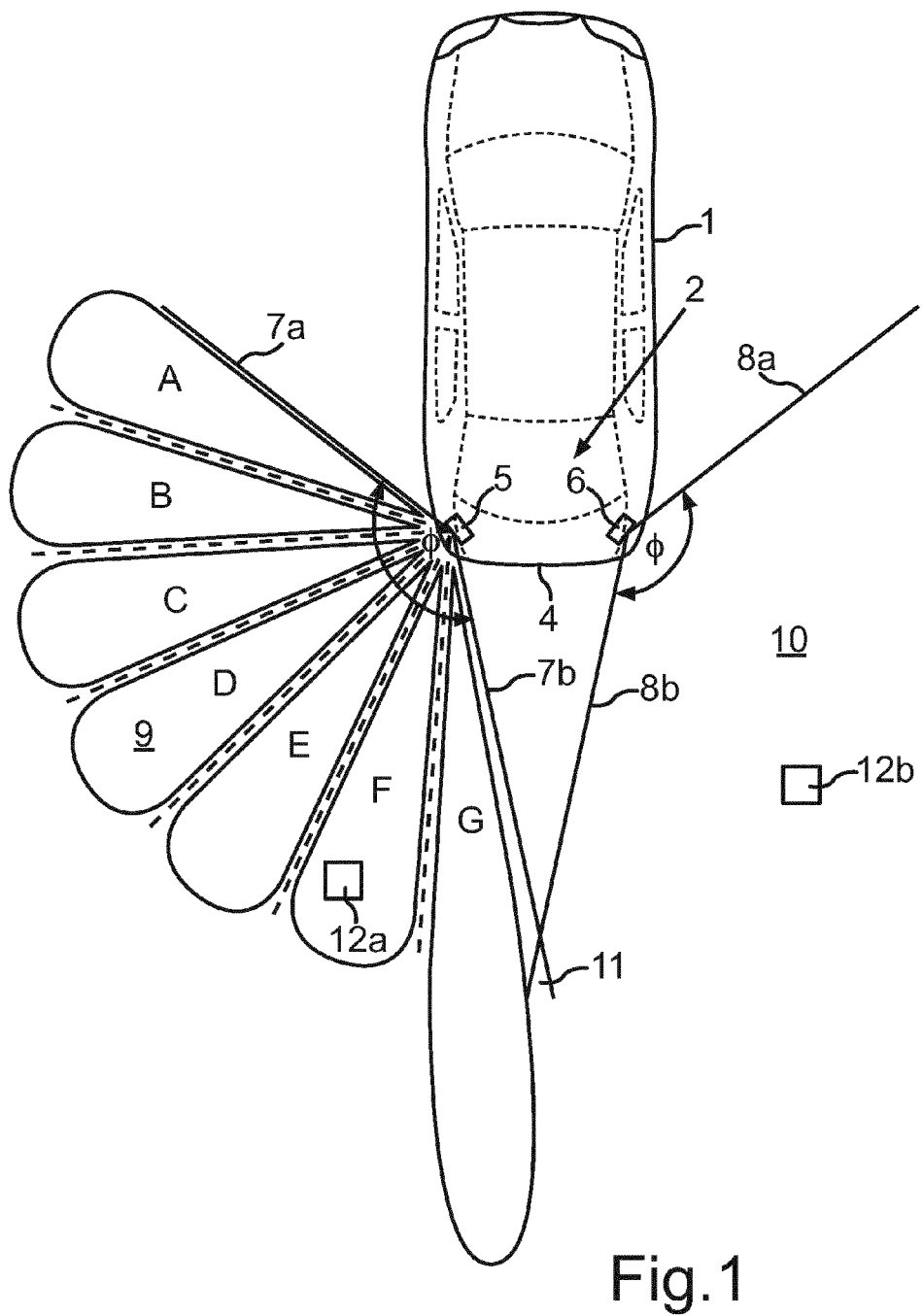

(52) U.S. Cl.
CPC ............... *G01S 2013/9378* (2013.01); *G01S 2013/9385* (2013.01); *G01S 2013/9389* (2013.01)

(56) References Cited

U.S. PATENT DOCUMENTS

| | | | |
|---|---|---|---|
| 6,121,918 A | 9/2000 | Tullsson | |
| 7,187,321 B2 * | 3/2007 | Watanabe | G01S 13/345 342/118 |
| 7,403,153 B2 * | 7/2008 | Kelly, Jr. | G01S 7/023 342/132 |
| 7,460,058 B2 * | 12/2008 | Nakanishi | G01S 7/354 342/118 |
| 7,463,181 B2 * | 12/2008 | Wintermantel | G01S 7/023 342/104 |
| 7,683,827 B2 * | 3/2010 | Kelly, Jr. | G01S 7/021 342/159 |
| 7,728,762 B2 * | 6/2010 | Sakamoto | G01S 7/35 342/109 |
| 8,125,375 B2 * | 2/2012 | Nakanishi | G01S 7/023 342/118 |
| 8,471,760 B2 * | 6/2013 | Szajnowski | G01S 7/023 342/104 |
| 8,565,294 B2 * | 10/2013 | Szajnowski | H04B 1/1027 375/227 |
| 9,146,302 B2 * | 9/2015 | Kojima | G01S 7/023 |
| 9,291,705 B2 * | 3/2016 | Nakagawa | G01S 7/292 |
| 2006/0125682 A1 | 6/2006 | Kelly, Jr. et al. | |
| 2007/0018886 A1 * | 1/2007 | Watanabe | G01S 13/345 342/173 |
| 2007/0120731 A1 | 5/2007 | Kelly, Jr. et al. | |
| 2008/0218406 A1 * | 9/2008 | Nakanishi | G01S 7/354 342/192 |
| 2008/0231497 A1 | 9/2008 | Sakamoto | |
| 2009/0310649 A1 * | 12/2009 | Fisher | H04B 1/7075 375/141 |
| 2011/0187579 A1 * | 8/2011 | Asada | G01S 13/30 342/27 |
| 2011/0291875 A1 | 12/2011 | Szajnowski | |

\* cited by examiner $$\begin{bmatrix} 0 & 0 & 0 & 1 & 2 & 3 & 4 & 0 & \ldots & 0 \\ 1 & 2 & 3 & 4 & 5 & 0 & 0 & 1 & \ldots & 0 \\ 0 & 0 & 0 & 0 & 1 & 0 & 0 & 1 & \ldots & 0 \\ \ldots & \ldots & \ldots & \ldots & \ldots & \ldots & \ldots & \ldots & \ldots & 5 \\ 1 & 2 & 3 & 0 & 0 & 1 & 2 & 3 & \ldots & 0 \end{bmatrix}$$

Fig.5

$$\begin{bmatrix} 0 & 0 & 0 & 0 & 0 & 0 & 0 & 0 & \ldots & 0 \\ 1 & 2 & 3 & 4 & 5 & 6 & 7 & 0 & \ldots & 0 \\ 0 & 0 & 0 & 0 & 0 & 0 & 0 & 0 & \ldots & 0 \\ \ldots & \ldots & \ldots & \ldots & \ldots & \ldots & \ldots & \ldots & \ldots & 0 \\ 0 & 0 & 0 & 0 & 0 & 0 & 0 & 0 & \ldots & 0 \end{bmatrix}$$

Fig.6

$$\begin{bmatrix} 0 & 0 & 0 & 0 & 0 & 0 & 0 & 0 & \ldots & 0 \\ 0 & 0 & 0 & 1 & 2 & 3 & 4 & 0 & \ldots & 0 \\ 0 & 0 & 0 & 0 & 1 & 2 & 3 & 4 & \ldots & 0 \\ \ldots & \ldots & \ldots & \ldots & \ldots & \ldots & \ldots & \ldots & \ldots & 0 \\ 0 & 0 & 0 & 1 & 2 & 0 & 0 & 0 & \ldots & 0 \end{bmatrix}$$

Fig.7

METHOD FOR DETECTING INTERFERENCE IN A RECEIVED SIGNAL OF A RADAR SENSOR, DRIVER ASSISTANCE DEVICE AND MOTOR VEHICLE

The invention relates to a method for detecting interference in a received signal received by a radar sensor of a motor vehicle by means of an electronic computing device. For detecting a target object in an environment of the motor vehicle, a transmit signal is emitted by means of the radar sensor, which includes a sequence of consecutive frequency-modulated chirp signals. The radar sensor then receives an echo signal reflected on the target object as the received signal with the superimposed interference. After receiving the received signal, the interference in the chirp signals of the received signal is detected. The invention additionally relates to a driver assistance device for a motor vehicle as well as to a motor vehicle with such a device.

Automotive radar sensors are already prior art and are for example operated at a frequency of ca. 24 GHz or ca. 79 GHz. Radar sensors generally serve for detecting target objects in the environment of the motor vehicle and support the driver in driving the motor vehicle in various manner. On the one hand, radar sensors measure the distance between the target object and the vehicle. On the other hand, they also measure both the relative velocity to the target object and the so-called target angle, i.e. an angle between an imagined connecting line to the target object and a reference line, for instance the vehicle longitudinal axis.

Radar sensors are usually placed behind the bumper, for example in the respective corner regions of the bumper. For detecting the target object, the radar sensor emits a transmit signal (electromagnetic waves), which is then reflected on the target object to be detected and received by the radar sensor as radar echo. Therein, the interest is directed to the so-called "frequency modulated continuous wave radar" or "FMCW radar", in which the emitted signal includes a sequence (burst) of frequency-modulated chirp signals, which are emitted one after the other. Correspondingly, the received signal of the radar sensor also includes such a plurality of chirp signals, which are processed and evaluated with regard to the above mentioned measured variables. Therein, the received signal is first mixed down to the baseband and subsequently converted into a digital received signal with a plurality of samples by means of an analog-digital converter. The samples of the received signal are then processed by means of an electronic computing device (digital signal processor), which can be integrated in the radar sensor.

With a radar sensor, typically, a relatively wide azimuth angle range is covered in horizontal direction, which can even be 150°. Thus, the radar sensor has a relatively large azimuth detection angle such that the field of view or the detection range of the radar sensor in azimuth direction is correspondingly wide. The azimuth detection angle is usually symmetrical with respect to a radar axis extending perpendicularly to the front sensor area such that the azimuth detection angle is dimensioned from for example −75° to +75° with respect to the radar axis. This azimuth detection range can be divided in smaller partial ranges, which are irradiated one after the other by the radar sensor. For this purpose, for example, the main lobe of the transmitting antenna is electronically pivoted in azimuth direction, for example according to the phase array principle. In this case, the receiving antenna can have a receive characteristic in azimuth direction, with which the entire azimuth detection range is covered. Such a radar sensor is for example known from the document DE 10 2009 057 191 A1.

With such a wide azimuth detection range of the radar sensor, it can prove problematic that the radar sensor is exposed to various interference signals, which originate from different spatial directions and are superimposed on the received signal of the radar sensor. The received signal of the radar sensor thus includes not only the useful signal (the reflected transmit signal), but also interference, which optionally can falsify the detection of the target object. This interference is to be detected and suppressed, in particular completely filtered out of the received signal, in the radar sensor.

Various methods are already known from the prior art, which serve for detecting the interference in a received signal of a radar sensor. Such methods are for example known from the printed matters US 2006/0125682 A1, U.S. Pat. No. 6,094,160 A as well as U.S. Pat. No. 6,121,918 A. However, all of these methods relate to the detection and suppression of the interference in a single chirp signal. However, if the entire chirp signal is affected by interference, thus, detection and suppression of the interference in the chirp signal are often not possible.

From the document US 2011/0291875 A1, a method for improving the performance of an FMCW radar system is known.

An object of the invention is to demonstrate a solution, how in a method of the initially mentioned kind, in which the radar sensor emits a temporal sequence of frequency-modulated chirp signals, the interference in the received signal—in particular in the respective chirp signals of the received signal—can be particularly reliably detected.

According to the invention, this object is solved by a method, by a driver assistance device as well as by a motor vehicle having the features according to the respective independent claims. Advantageous implementations of the invention are the subject matter of the dependent claims, of the description and of the figures.

A method according to the invention serves for detecting interference in a received signal received by a radar sensor of a motor vehicle by means of an electronic computing device of the motor vehicle, which can for example also be integrated in the radar sensor. For detecting a target object in the environment of the motor vehicle, the radar sensor emits a transmit signal, which includes a sequence of consecutive frequency-modulated chirp signals. The transmit signal then reflects on the target object and again arrives at the radar sensor in the form of an echo signal. The radar sensor receives the echo signal as the received signal with the superimposed interference. After receiving the received signal, the interference in the chirp signals of the received signal is detected, namely by means of the electronic computing device. For detecting the interference within a chirp signal of the received signal, at least one sample of this chirp signal is compared to a sample of another chirp signal of the same sequence, and depending on this comparison it is determined whether or not at least one of the samples compared to each other is affected by interference.

The interference in the received signal of the radar sensor is detected by comparing the samples of a chirp signal to the samples of another chirp signal of the same sequence of chirp signals. Thus, two separate chirp signals of the same sequence are compared to each other, and depending on this comparison, it is determined whether or not at least one of these two chirp signals is affected by interference. Therein, the invention is based on the realization that two chirp signals of the same sequence, in particular two temporally immediately adjacent chirp signals, basically are not to exhibit a substantial mutual deviation due to the very low period of time of the pause between the emitted chirp signals (microsecond range). If such a deviation is determined, thus, this is a unique indication that at least one of these two chirp signals is affected by interference signals. By comparing the samples of a chirp signal to the corresponding samples of another chirp signal of the same sequence, thus, the interference in the chirp signals can be particularly reliably detected.

The detection of the interference in a single sample of a chirp signal is preferably effected in binary manner. This means that a sample can be interpreted as either free of interference or else as affected by interference. If this binary decision is made with respect to all of the samples of the received signal—and thus all of the samples of the entire sequence of chirp signals—thus, an interference matrix can be generated, in which it is indicated which samples are affected by interference and which are not. In such an interference matrix, each line of the matrix can be respectively associated with a different chirp signal. In the first line of the interference matrix, it can be indicated whether or not the individual samples of a first chirp signal of the received sequence are affected by interference. Thus, the first line of the interference matrix is associated with the first chirp signal of the sequence. The second line of the interference matrix can be associated with the second received chirp signal etc.

The detection of the interference in the respective chirp signal is preferably effected in the time domain. The received signal including the sequence of chirp signals is preferably first mixed down to the baseband by means of a mixer and then converted to a digital received signal with the aid of an analog-digital converter. The computing device then processes the samples of the individual chirp signals and evaluates them with regard to the interference. From the received chirp signals of the same sequence, a receive matrix can be provided, in which the samples of the chirp signals of the received signal are indicated. In the first line, the samples of the first received chirp signal can be indicated, in the second line the samples of the second chirp signal, etc. The computing device can then process such a receive matrix.

For detecting the interference within a chirp signal, preferably, at least one sample of this chirp signal is compared to a sample of an immediately adjacent chirp signal of the same sequence. Namely, two adjacent chirp signals basically are not to exhibit a large mutual deviation such that reliable conclusions to interference can be made depending on the comparison of two adjacent chirp signals.

Preferably, for detecting the interference within the one chirp signal, the at least one sample of this chirp signal is compared to a sample, which has the same row position within the respective sample row and thus within the respective chirp signal in the other chirp signal—in particular in the immediately adjacent chirp signal. With respect to the above mentioned receive matrix, this means that the samples are compared to each other column by column and thus a sample of a chirp signal is compared to an in particular adjacent sample of the same column. Namely, these two samples are to be approximately identical or only have a very low mutual deviation due to the very short period of time of the pause between the chirp signals. Namely, these two samples have the same phasing within the respective chirp signal.

It can also be provided that for detecting the interference within the one chirp signal, a plurality of samples of this chirp signal is individually compared to each one sample of a different, in particular immediately adjacent chirp signal of the same sequence. Then, it can be determined individually for each sample of the one chirp signal whether or not the sample is affected by interference. Thus, all of the samples of a chirp signal can be examined with respect to the interference separately from each other.

Preferably, the comparison of the samples includes that a difference (gradient or "slope") between the two samples is determined and it is decided based on the amount of the difference whether or not at least one of the samples, in particular the two samples compared to each other, is affected by interference. This type of comparison can be implemented in the computing device without much computational effort and additionally provides a unique result about the interference of the samples.

This can be configured such that at least one of the compared samples, in particular the two samples, is interpreted as affected by interference if the amount of the difference is greater than a preset limit value. If the limit value is exceeded, thus, deviation of the two samples from each other is present such that interference can be reliably assumed in these two samples.

Optionally, it can also be provided that the limit value is dynamically adjusted by means of the computing device in the operation of the radar sensor. The adjustment of this limit value can optionally also be effected individually for different partial ranges of an entire horizontal field of view of the radar sensor, which are irradiated one after the other by the radar sensor.

Preferably, the detection of the interference is effected in an n-th sample within an i-th chirp signal according to the following formula:

$$\text{slope}(i_{chirp}, n_{sample}) = |s(i_{chirp}+1, n_{sample}) - s(i_{chirp}, n_{sample})|,$$

wherein $i_{chirp}$ denotes the row position of the examined chirp signal within the sequence of chirp signals, $n_{sample}$ denotes the row position of the examined sample within the chirp signal and $s(i,n)$ denotes the samples of the two-dimensional received signal (receive matrix).

This formula can also be applied to a plurality of samples, in particular to all of the samples, of the chirp signal. Additionally or alternatively, this formula can also be applied to a plurality of chirp signals of the same sequence, in particular to every second chirp signal of the sequence or else to all of the chirp signals except for the last chirp signal of the sequence. Thus, it can be individually determined for a plurality of samples of the received signal whether or not these samples are affected by interference.

The invention also relates to a driver assistance device for a motor vehicle including an automotive radar sensor as well as an electronic computing device. The computing device can also be integrated in the radar sensor. For detection of a target object in an environment of the motor vehicle, the radar sensor is formed for emitting a transmit signal including a sequence of consecutive frequency-modulated chirp signals and for receiving an echo signal reflected on the target object as the received signal with a superimposed interference. The computing device is adapted to detect the interference in the chirp signals of the received signal. The computing device is adapted to perform a method according to the invention.

A motor vehicle according to the invention includes a driver assistance device according to the invention.

The preferred embodiments presented with respect to the method according to the invention and the advantages thereof correspondingly apply to the driver assistance device according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on individual preferred embodiments as well as with reference to the attached drawings.

Figures 2, 3:
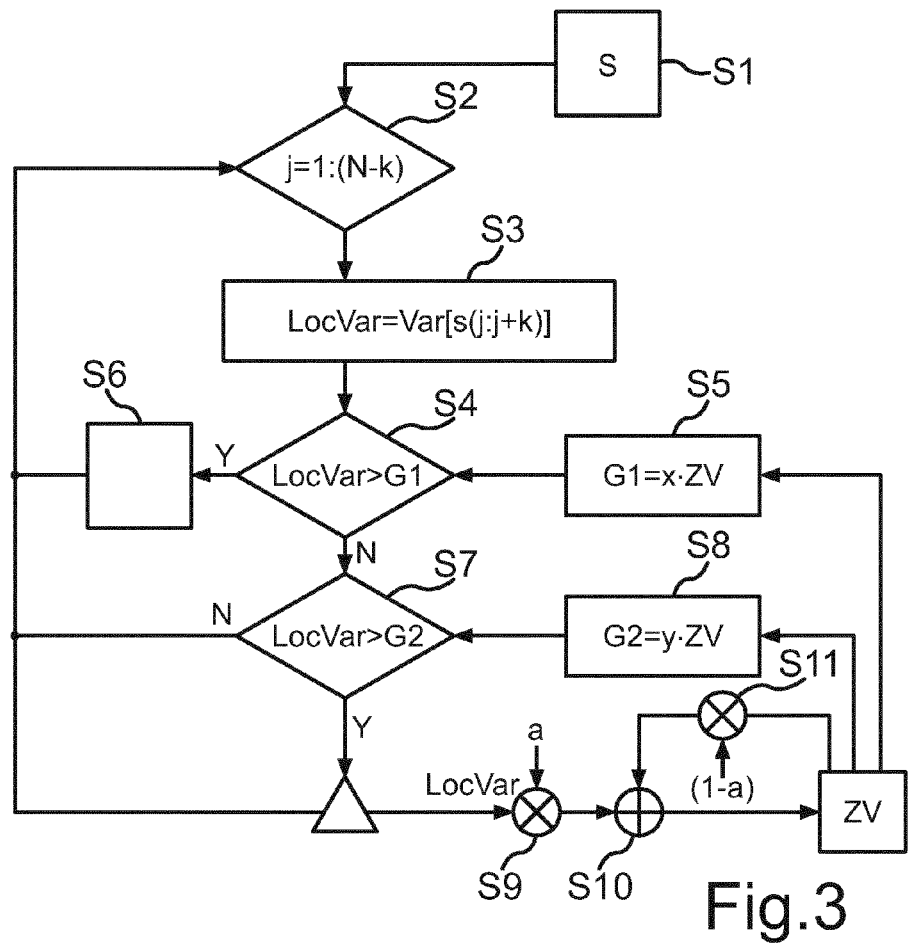
Figure 4:
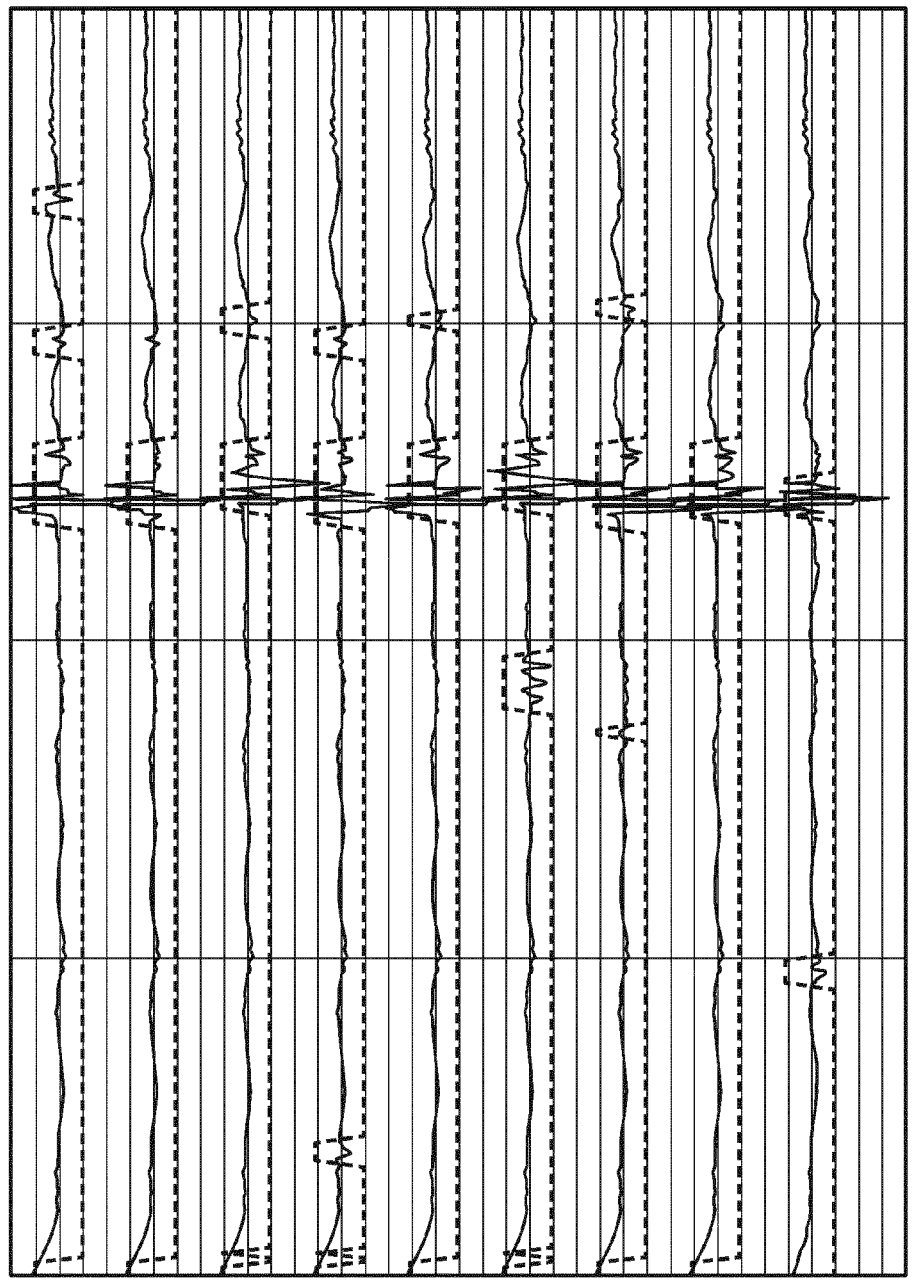

There show:

FIG. 1 in schematic illustration a motor vehicle with a driver assistance device according to an embodiment of the invention;

FIG. 2 an exemplary receive matrix of a radar sensor with a sequence of chirp signals, wherein the lines of the receive matrix each include all of the samples of a single chirp signal;

FIG. 3 a flow diagram or block diagram of a method according to an embodiment of the invention for detecting interference in the received signal;

FIG. 4 temporal progresses of a total of nine chirp signals of a received signal of the radar sensor, wherein a temporal progress of the interference is presented to each chirp signal; and FIG. 5-7 an exemplary interference matrix, respectively, in which the position of the interferences in the received signal (in the receive matrix) is identified with positive integers.

A motor vehicle 1 illustrated in FIG. 1 is for example a passenger car. The motor vehicle 1 includes a driver assistance device 2 assisting the driver in driving the motor vehicle 1. For example, it can be a blind spot warning and/or a lane change assist and/or a cross traffic alert and/or a door opening assist and/or a rear pre-crash.

Two radar sensors 5, 6 are associated with the driver assistance device 2, which are disposed behind a rear bumper 4 of the motor vehicle 1. The first radar sensor 5 is disposed in a left rear corner region of the motor vehicle 1, while the second radar sensor 6 is disposed in a right rear corner region. Both radar sensors 5, 6 are located behind the bumper 4 and are therefore not visible from the outside of the motor vehicle 1.

The radar sensors 5, 6 are frequency-modulated continuous wave radar sensors (FMCW) in the embodiment. The radar sensors 5, 6 each have an azimuth detection range $\varphi$, which is bounded by two lines 7a, 7b (for the left radar sensor 5) and 8a, 8b (for the right radar sensor 6), respectively, in FIG. 1. The azimuth detection angle $\varphi$ is for example 150°. By this angle $\varphi$, a field of view 9 and 10, respectively, of the respective radar sensor 5, 6 in azimuth direction and thus in horizontal direction is respectively defined. The fields of view 9, 10 can also overlap each other such that an overlap region 11 exists.

Each radar sensor 5, 6 includes an integrated computing device for example in the form of a digital signal processor, which drives the radar sensor 5, 6 and additionally processes and evaluates the received signals. However, alternatively, an external computing device common to the two sensors 5, 6 can also be provided, which is able to then process the received signals of the two sensors 5, 6.

In their respective fields of view 9, 10, the radar sensors 5, 6 can detect target objects 12a (on the left) and 12b (on the right) external to vehicle. In particular, the radar sensors 5, 6 can determine the distance of the target objects 12a and 12b, respectively, from the respective radar sensor 5, 6 as well as respectively the target angle and the relative velocity of the target objects 12a and 12b, respectively, with respect to the motor vehicle 1—they are measured variables of the radar sensors 5, 6.

With further reference to FIG. 1, the radar sensor 5—and analogously also the sensor 6—can successively irradiate various partial ranges A, B, C, D, E, F, G of the azimuthal field of view 9. These partial ranges A to G represent angular ranges, wherein for successively covering the partial ranges A to G for example a transmit lobe of the transmitting antenna of the radar sensor 5 is electronically pivoted in azimuth direction, namely according to the phase array principle. The different orientations of the transmit lobe are schematically indicated for the different partial ranges A to G in FIG. 1. The receiving antennas of the radar sensor 5 can overall have a wide receive characteristic in azimuth direction, with which the entire azimuthal field of view 9 is covered. Other configurations can alternatively realize narrow reception angle ranges in association with wide transmit lobes.

In FIG. 1, for the sake of clarity, only the partial ranges A to G of the field of view 9 of the first radar sensor 5 are illustrated. However, correspondingly, the horizontal field of view 10 of the second radar sensor 6 is here also divided in multiple partial ranges. Although the further description relates to the mode of operation of the first sensor 5, the mode of operation of the second sensor 6 corresponds to that of the first sensor 5.

The number of the partial ranges A to G is only exemplarily illustrated in FIG. 1 and can be different according to embodiment. In the embodiment, a total of seven partial ranges A to G is provided, which are illuminated one after the other by the radar sensor 5.

The mode of operation of the radar sensor 5 is as follows: in a single measurement cycle of the radar sensor 5, the main lobe of the transmitting antenna is once stepwise pivoted from the partial range A up to the partial range G, such that the partial ranges A to G are illuminated one after the other. Therein, for each partial range A to G, a temporal sequence of frequency-modulated chirp signals (chirps) is respectively emitted. First, such a sequence of chirp signals is emitted for the partial range A. After a preset transmission pause, then, a sequence of chirp signals is emitted to the partial range B. After a further preset transmission pause, then, the partial range C is irradiated etc. As is apparent from FIG. 1, the radar sensor 5 has a larger reach for the partial range G than for the remaining partial ranges A to F. This is achieved in that the emitted sequence has more chirp signals for the partial range G than for the remaining ranges A to F. While for example 16 chirp signals are emitted within the respective sequence for the partial ranges A to F, for example a total of 64 chirp signals within the sequence is emitted for the partial range G.

The detection of the target objects 12a, 12b is therefore individually and separately effected for each partial range A to G. Thus, it is possible to track the target objects 12a, 12b in the entire field of view 9, 10.

In a single measurement cycle of the radar sensor 5, thus, in the embodiment, a total of seven sequences of frequency-modulated chirp signals is emitted, namely a sequence of 16 chirp signals for the partial ranges A to F respectively as well as a sequence of 64 chirp signals for the partial range G. Correspondingly, the received signals also each include a plurality of chirp signals. The received signal for the partial range A includes—if reflection on a target object occurs—16 chirp signals; the received signal for the partial range B also includes 16 chirp signals, and the respective received signals for the partial ranges C to F also each include 16 chirp signals. By contrast, the received signal from the partial range G includes 64 chirp signals.

However, the received signals of the radar sensor 5 do not only include useful signals from the target object, but are also affected by interference signals. Such interference signals superimposed on the received signal can for example originate from the other radar sensor 6 or else from extraneous sources external to vehicle, such as for example from sensors of other vehicles or the like. These interferences are now detected and suppressed or filtered out in the received signal of the radar sensor 5.

Therein, the detection and/or the suppression of the interference are effected separately and individually for each partial range A to G. This means that the respective received signals from the partial ranges A to G are processed and evaluated separately from each other. An exemplary receive matrix provided based on a received signal for one of the partial ranges A to G (e.g. for the partial range A) is illustrated in FIG. 2. For generating the receive matrix, the received signal including the plurality of chirp signals (e.g. 16 chirp signals) is mixed down to the baseband and sampled with the aid of an analog-digital converter. The samples of a single chirp signal are then combined in a common line of the receive matrix such that each line of the receive matrix includes the samples of an entire single chirp signal. In the first line, thus, the samples of the first chirp signal are indicated, in the second line, the samples of the second chirp signal etc. Therein, N denotes the number of the samples within a chirp signal, wherein for example it applies: N=256. By contrast, I denotes the number of the chirp signals within the sequence. As already explained, depending on the partial range A to G, it can apply: I=16 or I=64. The samples of the received signal are denoted by s(i,n).

For each received signal—and thus for each receive matrix—the interference is individually detected and suppressed. The interference is also detected and suppressed individually for each chirp signal within the receive matrix and thus individually for each line of the receive matrix. Below, two different methods for detecting the interference are described. In the operation of the radar sensor 5 (and also of the radar sensor 6 separately) at least one of the two methods is thereby applied. Advantageously, the two methods can also be combined with each other and the results then be compared to each other and thus made plausible.

According to the first method, the interference in a certain chirp signal (a certain line of the receive matrix) is detected in the manner that the samples of this chirp signal are each individually compared to a sample of an adjacent, in particular of an immediately succeeding chirp signal. Therein, the comparison is effected between each two samples of adjacent chirp signals, which (the samples) have the same row position (index n) within the respective row of samples. For this purpose, a difference between the two samples is determined, and then it is decided whether or not these two samples are affected by interference based on the amount of the difference. This decision is made in binary manner. This means that a sample can be interpreted either as free of interference or else as affected by interference.

According to the first method, for every other chirp signal (for every other line of the receive matrix) or for each chirp signal except for the last chirp signal, the following difference is each individually calculated for each sample of this chirp signal:

$$\text{slope}(i_{chirp}, n_{sample}) = |s(i_{chirp}+1, n_{sample}) - s(i_{chirp}, n_{sample})|,$$

wherein $i_{chirp}$ denotes the row position of the examined chirp signal within the sequence, $n_{sample}$ denotes the row position of the examined sample within the chirp signal, $\text{slope}(i_{chirp}, n_{sample})$ denotes the amount of the difference and $s(i_{chirp}, n_{sample})$ denotes the samples of the received signal. The computing device of the radar sensor 5 then checks for each sample whether the amount of the difference is greater than a preset limit value. If the amount of the difference is greater than the limit value, the two samples $S(i_{chirp}+1, n_{sample})$ as well as $s(i_{chirp}, n_{sample})$ are interpreted as affected by interference.

For each sample of the receive matrix, thus, it can be checked whether or not this sample is affected by interference.

The second method for detecting the interference is now explained in more detail with reference to FIG. 3:

In a first step S1, the receive matrix s with samples is provided. Each line of the receive matrix s is then separately processed one after the other. In a following second step S2, a counter value j is implemented, which is incremented, thus respectively increased by one, from 1 to N−k. Therein, N denotes the number of the samples within a line of the receive matrix and is for example equal to 256, while k is a preset constant and for example it applies: k=4.

In a further step S3, first, a subset of samples s(j:j+k) within the examined line is defined. Thus, the subset can include a total of five samples, namely five immediately consecutive samples of the same line of the receive matrix and therefore of the same chirp signal. Based on this subset of samples s(j:j+k), then, a parameter value is determined, which characterizes a deviation of these samples s(j) to s(j+k) from each other and thus a dispersion of the samples within the examined subset. In the embodiment, the local variance LocVar of these samples s(j) to s(j+k) is determined as the parameter value.

In a following step S4, the computing device checks whether the parameter value LocVar is greater than a first threshold value G1. This first threshold value G1 is calculated from an intermediate value ZV by multiplication of this intermediate value ZV by a variable x in step S5. The variable x can for example be set to 11.

If the check in step S4 reveals that the parameter value LocVar is greater than the threshold value G1, thus, the method proceeds to a step S6, in which the following is implemented: first, one of the samples, in particular the sample s(j+2), is interpreted as affected by interference and identified as such. If the preceding sample, in particular the sample s(j+1), of the same line was not identified as affected by interference and additionally the second preceding sample, in particular the sample s(j), was identified as affected by interference, the immediately preceding sample (s(j+1)) is also interpreted as affected by interference and identified as such. The method then returns to step S2, in which the counter value j is incremented.

If the check in step S4 reveals that the parameter value LocVar is smaller than the first threshold value G1, thus, the method proceeds to a further step S7, in which is it checked by the computing device whether or not the intermediate value ZV is to be adapted and thus to be set to a new value. To this, the parameter value LocVar is compared to a second threshold value G2. If the parameter value LocVar is greater than the second threshold value G2, thus, the method returns to step S2, in which the counter value j is incremented. However, if the parameter value LocVar is smaller than the second threshold value G2, thus, the intermediate value ZV is adapted.

The second threshold value G2, too, is calculated immediately from the intermediate value ZV, namely by multiplication of the intermediate value ZV by a constant y according to step S8. This constant y is smaller than the constant x and is for example 3. Both values x, y can optionally also be variably set and thus be varied in operation.

The first threshold value G1 is therefore greater than the second threshold value G2. Since the threshold values G1 and G2 are directly calculated from the intermediate value ZV, the adaptation of the two threshold values G1 and G2 is effected at the same time by variation of the intermediate value ZV. This means that the two threshold values G1, G2 are varied synchronously and proportionally to each other.

If it is determined in step S7 that the parameter value LocVar is smaller than the second threshold value G2, thus, the adaptation of the intermediate value ZV is effected on the one hand and the method also returns to step S2 on the other hand. The adaptation of the intermediate value ZV is configured as follows:

For the calculation of the new intermediate value ZV, a constant a is defined, which can for example be 0.0000075. In step S9, the parameter value LocVar is multiplied by the constant a, and the result of this multiplication is supplied to an addition in step S10. The result of a multiplication of the current intermediate value ZV by the factor (1−a) is supplied to this addition as the second addend, which is performed in step S11. The new intermediate value therefore results from the following equation:

$$ZV = a \cdot \text{LocVar} + (1-a) \cdot ZV',$$

wherein ZV denotes the new intermediate value and ZV' denotes the previous intermediate value.

The intermediate value ZV and thus the threshold values G1 and G2 are therefore dynamically adjusted in the operation of the radar sensor 5, 6. This adjustment is preferably individually effected for each partial range A to G of the field of view 9, 10 of the radar sensor 5, 6.

If the interference in the subset of samples s(j:j+k) is detected in step S4 and j=1 (beginning of the chirp signal), thus, all of the samples s(1) to s(1+k) are interpreted as affected by interference and identified as such. At the end of the examined chirp signal too, if j=N−k (e.g. 251) and the interference is detected in step S4 (LocVar>G1), all of the samples of this subset s(N−k) to s(N) are interpreted as affected by interference and identified as such.

In case between two samples s(j) and s(j+2) identified as affected by interference, there is a sample s(j+1), in which interference is not detected, it is provided that this sample s(j+1) too is (re)interpreted as affected by interference.

Optionally, the values x and/or y and/or a can be adjusted individually for each partial range A to G.

Independently of the used method for detecting the interference, an interference matrix is generated as a result, in which it is separately specified to each sample, whether or not the interference has been detected in this sample. An exemplary interference matrix is illustrated in FIG. 5. Therein, the size of the interference matrix corresponds to the size of the receive matrix, wherein the samples affected by interference are designated by integers greater than zero. The samples, in which interference was not detected, are marked with "0". The samples within a common line, in which interference was detected and which are associated with one and the same interference, are provided with serial numbers. The sample at the beginning of the interference is marked with "1", the next sample with "2", the further sample with "3" etc. up to the next sample, in which interference was not detected. The last sample of an interference is therefore marked with a number, which corresponds to the length of the interference, wherein the length of the interference is indicated by the number of the samples affected by interference. The distance between two interferences within a chirp signal tolerates at least two samples. If a distance of a single sample between two interferences is detected, thus, this sample is also marked as affected by interference and the two interferences are combined.

In the example according to FIG. 5, accordingly, interference from the fourth sample of the first chirp signal is detected, wherein the length of this interference is four samples. In two of the chirp signals, two interferences are respectively detected, wherein one of the interferences directly begins at the first sample.

In FIG. 4, temporal progresses of chirp signals of a received signal are illustrated (solid lines). The progress of the detected interferences (dashed lines) is also presented to each chirp signal. As is apparent from FIG. 4, the decision is binary: either interference is detected in a certain sample or interference is not detected.

If the interference matrix is present, thus, the interference in the received signal (in the receive matrix) can be suppressed. Therein, in the computing device of the radar sensor 5, a total of three different signal correction algorithms is stored, which serve for removing the interference from the received signal. For each chirp signal and thus for each line of the receive matrix, therein, the optimum signal correction algorithm is respectively individually selected in order to suppress the interference within this chirp signal. Therein, the selection is effected depending on the detected interference and in particular depending on the position of the interference within the respective chirp signal, depending on the position of the chirp signal within the sequence and/or depending on the length of the detected interference. The selection can also be effected individually for each detected interference.

In the embodiment, the following three signal correction algorithms are stored in the computing device:

First algorithm: according to this first algorithm, interpolation of the samples affected by interference over the immediately adjacent chirp signals is proposed. Therein, the interpolation is effected column by column in the receive matrix. The sample of a chirp signal affected by interference is replaced with an interpolated value, which is calculated by linear interpolation of samples, which have the same row number (row position) in the respective immediately adjacent chirp signals.

Second algorithm: according to this second algorithm, interpolation within a certain chirp signal is performed, the samples of which are affected by interference. Here, the linear interpolation is effected based on basic values, which are located on the two sides of samples affected by interference. Therein, at least two basic values can be assumed respectively on the two sides, which are free of interference. However, if the interference is detected at the beginning of a chirp signal, as it is for example illustrated in FIG. 5 in the second line of samples, thus, on the left side of the interfered samples, a constant, preset value can be defined as the basic value for the interpolation.

Third algorithm: according to the third algorithm, the interfered samples are replaced with a preset, constant value.

The first algorithm is selected for the samples of a certain chirp signal whenever at least in the immediately adjacent chirp signals, at least those samples are free of interference, which have the same row position within the respective chirp signal. With respect to the receive matrix, this means that the first algorithm is selected whenever the immediately adjacent samples located in the same column are free of interference.

If the conditions for the first algorithm are not satisfied, thus, the second algorithm is selected. This second algorithm can also be selected only on condition that the length of the interference is smaller than a preset limit value, which can for example be 100 samples.

If the condition for the second algorithm either is not satisfied, thus, the third algorithm is selected.

In FIGS. 6 and 7, exemplary interference matrices are illustrated. With the interference in the second line of the interference matrix according to FIG. 6, the first algorithm can be selected because the respectively (vertically) adjacent samples of the adjacent lines are free of interferences. The affected samples of the second line are therefore replaced with interpolated values, which are calculated by linear interpolation of the respective adjacent samples of the two adjacent lines.

In the interference matrix according to FIG. 7, for the interferences presented there, the second algorithm is respectively selected because the adjacent lines are also affected by interference or the interference is detected in the last line. Because the length of the interference is respectively smaller than 100, the second algorithm can be selected, in which the affected samples are replaced with interpolated values, which are calculated by linear interpolation of the adjacent samples of the same line.

By such an approach, the interference as it is exemplarily illustrated in FIG. 4 can be completely eliminated, and the chirp signals can be "smoothed". Thus, the detection of the target objects is also effected considerably more precisely and reliably.

The invention claimed is:

1. A method for detecting interference in a received signal received by a radar sensor of a motor vehicle using an electronic computing device of the motor vehicle, the method comprising:
 emitting a transmit signal including a sequence of consecutive frequency-modulated chirp signals by the radar sensor, for detecting a target object in an environment of the motor vehicle;
 receiving an echo signal reflected on the target object as the received signal with a superimposed interference; and
 after receiving the received signal by the radar sensor, detecting the interference of the chirp signals of the received signal, wherein
 detecting the interference within a chirp signal of the received signal comprises comparing at least one sample of the chirp signal to a sample of another chirp signal of the same sequence, and depending on the comparison, determining whether or not at least one of the samples compared is affected by interference.

2. The method according to claim 1, wherein the another chirp signal comprises a temporally immediately adjacent chirp signal of the same sequence, wherein the at least one sample of the chirp signal is compared to the sample of the temporally immediately adjacent chirp signal of the same sequence.

3. The method according to claim 1, wherein the chirp signal and the another chirp signal correspond to respective sample rows in a sample matrix of the sequence of consecutive frequency-modulated chirp signals, wherein the at least one sample of the chirp signal is compared to the sample, which has a same row position within the respective sample row in the another chirp signal.

4. The method according to claim 1, wherein for detecting the interference within the chirp signal, a plurality of samples of the chirp signal each is individually compared to one sample of another chirp signal of the same sequence and for each sample of the chirp signal, individually determining whether or not the sample is affected by interference.

5. The method according to claim 4, wherein for detecting the interference within the chirp signal, at least one of the plurality of samples of the chirp signal is individually compared to one sample of an adjacent chirp signal of the same sequence.

6. The method according to claim 1, wherein the comparison of the samples includes that a difference (slope) between the samples is determined, and based on the amount of the difference (slope), determining whether the two samples are affected by interference.

7. The method according to claim 6, wherein at least one of the samples is interpreted as affected by interference if the amount of the difference (slope) is greater than a preset limit value.

8. The method according to claim 1, wherein the detection of the interference of an n-th sample within an i-th chirp signal is effected according to the following formula:

$$\text{slope}(i_{chirp}, n_{sample}) = |s(i_{chirp}+1, n_{sample}) - s(i_{chirp}, n_{sample})|,$$

wherein $i_{chirp}$ denotes a row position of the examined chirp signal within the sequence, $n_{sample}$ denotes the row position of the examined sample within the chirp signal and $s(i,n)$ denotes the n-th sample within an i-th chirp signal.

9. The method according to claim 8, wherein the formula is applied to a plurality of chirp signals of the sequence.

10. The method according to claim 9, wherein the plurality of chirp signals of the sequence comprise every second chirp signal of the sequence.

11. A driver assistance device for a motor vehicle, comprising:
 a radar sensor configured to:
  emit a transmit signal including a sequence of consecutive frequency-modulated chirp signals, and
  receive an echo signal reflected on a target object as a received signal with a superimposed interference for detecting the target object in an environment of the motor vehicle; and
 an electronic computing device configured to detect the interference in the chirp signals of the received signal, wherein for detection of the interference within a chirp signal of the received signal, the computing device compares at least one sample of this chirp signal to a sample of another chirp signal of the same sequence, and determines depending on the comparison whether at least one of the samples compared is affected by interference.

12. A motor vehicle comprising:
 a driver assistance device according to claim 11; and
 a bumper, wherein at least one radar sensor of the driver assistance device is hidden by the bumper and is not visible from outside of the motor vehicle.

* * * * *